(12) United States Patent
Vempati et al.

(10) Patent No.: US 10,630,529 B2
(45) Date of Patent: Apr. 21, 2020

(54) SYSTEM AND METHOD FOR PUSH-TO-TALK (PTT) IN MOBILE EDGE COMPUTING (MEC)

(71) Applicant: Kodiak Networks Inc., Plano, TX (US)

(72) Inventors: Brahmananda R. Vempati, Dallas, TX (US); Ramu Kandula, Plano, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 118 days.

(21) Appl. No.: 15/857,374

(22) Filed: Dec. 28, 2017

(65) Prior Publication Data

US 2018/0191550 A1    Jul. 5, 2018

Related U.S. Application Data

(60) Provisional application No. 62/440,242, filed on Dec. 29, 2016.

(51) Int. Cl.
| | |
|---|---|
| *G06F 15/16* | (2006.01) |
| *H04L 29/08* | (2006.01) |
| *H04W 76/45* | (2018.01) |
| *H04L 12/26* | (2006.01) |
| *H04W 28/02* | (2009.01) |

(52) U.S. Cl.
CPC ...... *H04L 29/08594* (2013.01); *H04L 67/142* (2013.01); *H04L 67/26* (2013.01); *H04W 76/45* (2018.02); *H04L 43/0811* (2013.01); *H04L 43/0876* (2013.01); *H04W 28/0289* (2013.01)

(58) Field of Classification Search
CPC .... H04W 76/45; H04L 67/42; H04L 67/1002; H04L 67/1004; H04L 65/406
See application file for complete search history.

(56) References Cited

U.S. PATENT DOCUMENTS

| | | |
|---|---|---|
| 3,912,874 A | 10/1975 | Botterell et al. |
| 4,796,293 A | 1/1989 | Blinken et al. |

(Continued)

FOREIGN PATENT DOCUMENTS

| | | |
|---|---|---|
| GB | 2338150 A | 3/1998 |
| JP | 200392776 A | 10/2004 |

(Continued)

OTHER PUBLICATIONS

The International Search Report and the Written Opinion, corresponding application serial No. PCT/US17/68987 filed Dec. 29, 2017, dated Mar. 26, 2018, all pages.

(Continued)

*Primary Examiner* — Yves Dalencourt

(57) ABSTRACT

In an embodiment, a method includes: synchronizing service information for a push-to-talk (PTT) client between a central PTT server and an first edge PTT server, the first edge PTT server and the PTT client being in a first network, the central PTT server being in a second network different from the first network; establishing a service session with the PTT client at the first edge PTT server in accordance with the service information, the service session used to conduct a PTT call with the PTT client; registering a first functionality for the PTT call at the first edge PTT server with the central PTT server; and performing the first functionality for the PTT call at the first edge PTT server.

18 Claims, 13 Drawing Sheets

(56) References Cited

U.S. PATENT DOCUMENTS

| | | | |
|---|---|---|---|
| 5,353,328 A | 10/1994 | Jokimies | |
| 5,442,809 A | 8/1995 | Diaz et al. | |
| 5,546,449 A | 8/1996 | Hogan et al. | |
| 5,711,011 A | 1/1998 | Urs et al. | |
| 5,752,196 A | 5/1998 | Ahvenainen et al. | |
| 5,987,318 A | 11/1999 | Alperovich et al. | |
| 5,987,331 A | 11/1999 | Grube et al. | |
| 6,011,976 A | 1/2000 | Michaels et al. | |
| 6,021,326 A | 2/2000 | Nguyen | |
| 6,138,011 A | 10/2000 | Sanders, III et al. | |
| 6,141,556 A | 10/2000 | Dougherty et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,473,501 B1 | 10/2002 | Paulsrud | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,725,053 B2 | 4/2004 | Rosen et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,993,355 B1 | 1/2006 | Pershan | |
| 6,996,414 B2 | 2/2006 | Vishwanathan et al. | |
| 7,026,926 B1 | 4/2006 | Walker, III | |
| 7,043,266 B2 | 6/2006 | Chaturvedi et al. | |
| 7,082,316 B2 | 7/2006 | Elden et al. | |
| 7,085,364 B1 | 8/2006 | Ahmed et al. | |
| 7,099,291 B2 | 8/2006 | Harris et al. | |
| 7,123,905 B1 | 10/2006 | Allaway et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,260,087 B2 | 8/2007 | Bao et al. | |
| 7,330,540 B2 | 2/2008 | Darby et al. | |
| 7,366,535 B2 | 4/2008 | Glass et al. | |
| 7,403,775 B2 | 7/2008 | Patel et al. | |
| 7,460,861 B2 | 12/2008 | Zabawskj | |
| 7,529,557 B2 | 5/2009 | Farrill | |
| 7,689,238 B2 | 3/2010 | Biswas et al. | |
| 7,738,861 B2 | 6/2010 | Fournier | |
| 7,738,892 B2 | 6/2010 | Ayyasamy et al. | |
| 7,738,896 B2 | 6/2010 | Patel et al. | |
| 7,751,348 B2 | 7/2010 | Shaffer et al. | |
| 7,764,950 B2 | 7/2010 | Patel et al. | |
| 7,787,896 B2 | 8/2010 | Kundu et al. | |
| 7,797,010 B1 | 9/2010 | Manroa et al. | |
| 7,813,722 B2 | 10/2010 | Patel et al. | |
| 7,853,279 B2 | 12/2010 | Patel et al. | |
| 8,036,692 B2 | 10/2011 | Ayyasamy et al. | |
| 8,244,252 B2 | 8/2012 | Descombes | |
| 8,369,829 B2 | 2/2013 | Nagubhai et al. | |
| 8,478,261 B2 | 7/2013 | Vempati et al. | |
| 8,498,660 B2 | 7/2013 | Lawler et al. | |
| 8,670,760 B2 | 3/2014 | Lawler et al. | |
| 8,676,189 B2 | 3/2014 | Lawler et al. | |
| 9,282,130 B1 | 3/2016 | Goepp et al. | |
| 2001/0005372 A1 | 6/2001 | Cave et al. | |
| 2002/0009990 A1 | 1/2002 | Kleier et al. | |
| 2002/0024943 A1 | 2/2002 | Karaul et al. | |
| 2002/0077136 A1 | 6/2002 | Maggenti et al. | |
| 2002/0086659 A1 | 7/2002 | Lauper | |
| 2002/0086676 A1 | 7/2002 | Hendrey et al. | |
| 2002/0102989 A1 | 8/2002 | Calvert et al. | |
| 2002/0187750 A1 | 12/2002 | Majumdar | |
| 2002/0196781 A1 | 12/2002 | Salovuori | |
| 2003/0009463 A1 | 1/2003 | Gallant | |
| 2003/0016632 A1 | 1/2003 | Refai et al. | |
| 2003/0017836 A1 | 1/2003 | Vishwanathan et al. | |
| 2003/0053434 A1* | 3/2003 | Chow | H04W 4/10 370/338 |
| 2003/0078064 A1 | 4/2003 | Chan | |
| 2003/0119540 A1 | 6/2003 | Mathis | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden et al. | |
| 2004/0095954 A1 | 5/2004 | Varney et al. | |
| 2004/0121760 A1 | 6/2004 | Wetman et al. | |
| 2004/0127233 A1 | 7/2004 | Harris et al. | |
| 2004/0152441 A1 | 8/2004 | Wong | |
| 2004/0176100 A1 | 9/2004 | Florkey et al. | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0219941 A1 | 11/2004 | Haaramo et al. | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0119012 A1 | 6/2005 | Merheb et al. | |
| 2005/0143135 A1 | 6/2005 | Brems et al. | |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0261016 A1 | 11/2005 | Patel et al. | |
| 2006/0003740 A1 | 1/2006 | Munje | |
| 2006/0003751 A1 | 1/2006 | Vo | |
| 2006/0003783 A1* | 1/2006 | Fukui | H04W 4/10 455/517 |
| 2006/0019654 A1 | 1/2006 | Farrill | |
| 2006/0029189 A1 | 2/2006 | Patel et al. | |
| 2006/0030347 A1 | 2/2006 | Biswas | |
| 2006/0056361 A1 | 3/2006 | Jiang et al. | |
| 2006/0067499 A1 | 3/2006 | Oliveira et al. | |
| 2006/0078064 A1 | 4/2006 | Schmidt et al. | |
| 2006/0094455 A1 | 5/2006 | Hannu et al. | |
| 2006/0116150 A1 | 6/2006 | Bhutiani | |
| 2006/0128411 A1 | 6/2006 | Turcanu | |
| 2006/0178138 A1 | 8/2006 | Ostroff et al. | |
| 2006/0189337 A1 | 8/2006 | Farrill et al. | |
| 2006/0198334 A1 | 9/2006 | Civanlar et al. | |
| 2006/0205427 A1* | 9/2006 | Laible | H04M 3/385 455/518 |
| 2006/0205429 A1* | 9/2006 | Ryoo | H04W 4/10 455/518 |
| 2006/0229090 A1 | 10/2006 | LaDue | |
| 2006/0234687 A1 | 10/2006 | Patel et al. | |
| 2007/0037562 A1 | 2/2007 | Smith-Kerker et al. | |
| 2007/0037597 A1 | 2/2007 | Biswas et al. | |
| 2007/0037598 A1 | 2/2007 | Ayyasamy et al. | |
| 2007/0049314 A1 | 3/2007 | Balachandran et al. | |
| 2007/0070976 A1 | 3/2007 | Mussman et al. | |
| 2007/0094409 A1 | 4/2007 | Crockett et al. | |
| 2007/0099609 A1 | 5/2007 | Cai | |
| 2007/0133478 A1 | 6/2007 | Armbruster et al. | |
| 2007/0133757 A1 | 6/2007 | Girouard et al. | |
| 2007/0154005 A1 | 7/2007 | Daigle | |
| 2007/0189487 A1 | 8/2007 | Sharland et al. | |
| 2007/0190492 A1 | 8/2007 | Schmitt | |
| 2007/0190984 A1 | 8/2007 | Ayyasamy et al. | |
| 2007/0197234 A1 | 8/2007 | Gill et al. | |
| 2007/0204039 A1 | 8/2007 | Inamdar | |
| 2007/0217591 A1 | 9/2007 | Yasuma | |

(56) References Cited

U.S. PATENT DOCUMENTS

| | | |
|---|---|---|
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0176460 A1 | 7/2009 | Mienville et al. |
| 2009/0187633 A1 | 7/2009 | Koponen et al. |
| 2009/0209235 A1 | 8/2009 | Lawler et al. |
| 2009/0279512 A1 | 11/2009 | Fujishima |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0265856 A1* | 10/2012 | Major ............... H04N 21/2225 709/219 |
| 2013/0021965 A1 | 1/2013 | Chu et al. |
| 2013/0155875 A1 | 6/2013 | Ayyasamy et al. |
| 2013/0157699 A1* | 6/2013 | Talwar ................ H04L 51/38 455/466 |
| 2013/0159539 A1 | 6/2013 | Lindner et al. |
| 2013/0196706 A1 | 8/2013 | Patel et al. |
| 2013/0272436 A1 | 10/2013 | Makhlouf et al. |
| 2013/0337859 A1 | 12/2013 | Patel et al. |
| 2014/0078898 A1 | 3/2014 | Anchan et al. |
| 2014/0148210 A1 | 5/2014 | Kundu et al. |
| 2015/0078295 A1 | 3/2015 | Mandyam et al. |
| 2015/0092704 A1 | 4/2015 | Chen |
| 2016/0269945 A1 | 9/2016 | Jang et al. |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", trackwell.com, Oct. 2002, pp. 1-1.

* cited by examiner

US 10,630,529 B2

SYSTEM AND METHOD FOR PUSH-TO-TALK (PTT) IN MOBILE EDGE COMPUTING (MEC)

CROSS-REFERENCE TO RELATED APPLICATIONS

The present application is related to and claims benefit under 35 U.S.C. § 119(e) from U.S. Provisional Patent Application Ser. No. 62/440,242, filed on Dec. 29, 2016, titled "System and Method for Push to Talk (PTT) in Mobile Edge Computing (MEC)," the entire contents of which being incorporated herein by reference.

BACKGROUND OF THE INVENTION

Push-to-talk (PTT) platforms involve providing PTT functionality (e.g., call group management, call origination, call transmittal, talk-back call termination, floor management, filtering, and the like) through PTT clients on client devices. The PTT functions may be performed by one or more servers, and communications between the client devices and the servers may be performed over a telecommunications network (e.g., a carrier network).

Mobile edge computing (MEC) is an emerging technology that enables a mobile user to benefit from low latency connectivity to application services by hosting these application services (e.g., PTT) on compute resources localized to (e.g., closer to) the user on the mobile edge (e.g. alongside a radio network element such as eNodeB (eNB) or radio network controller (RNC)). MEC is in contrast to the conventional mobile services model wherein the mobile network is used to provide connectivity to application services hosted at one or more centralized locations (e.g., in a backhaul network). An application service on the mobile edge may be a standalone service or may be augmented by a centralized backend service.

Accordingly, there is a need for a system and method for push-to-talk (PTT) in mobile edge computing (MEC).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
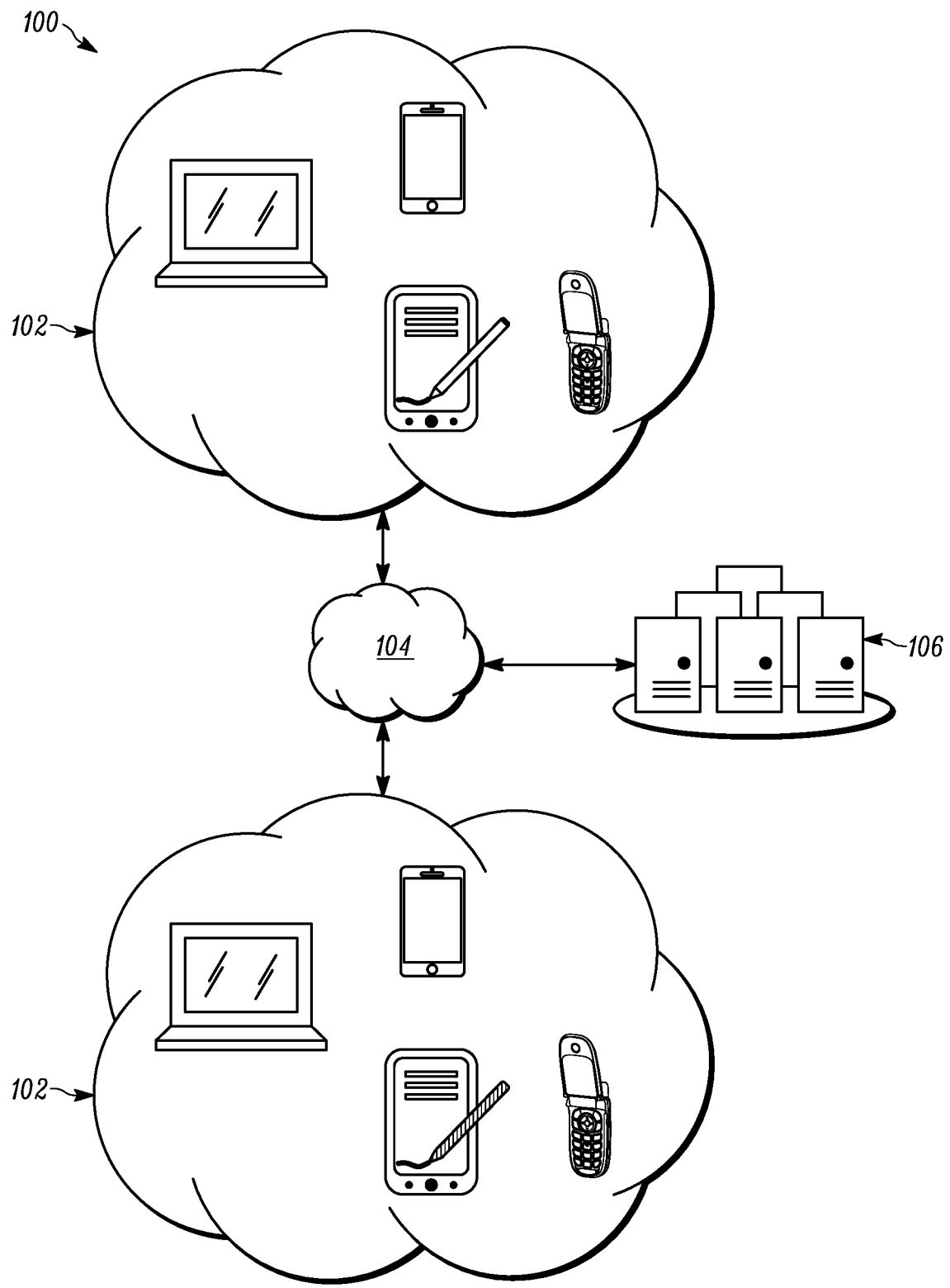
FIG. 1 illustrates a communications system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, a method includes: synchronizing service information for a push-to-talk (PTT) client between a central PTT server and an first edge PTT server, the first edge PTT server and the PTT client being in a first network, the central PTT server being in a second network different from the first network; establishing a service session with the PTT client at the first edge PTT server in accordance with the service information, the service session used to conduct a PTT call with the PTT client; registering a first functionality for the PTT call at the first edge PTT server with the central PTT server; and performing the first functionality for the PTT call at the first edge PTT server.

In some embodiments, the first network is a radio access network (RAN), and the first edge PTT server is deployed at one of a base station site of the RAN, a radio network controller site of the RAN, or a cell aggregation site of the RAN. In some embodiments, the first network is a local area network. In some embodiments, the method further includes: storing session state information for the PTT client at the first edge PTT server; and synchronizing the session state information for the PTT client between the central PTT server and the first edge PTT server. In some embodiments, the method further includes: copying the session state information for the PTT client from the first edge PTT server to a second edge PTT server; unregistering the first functionality for the PTT call from the first edge PTT server with the central PTT server; and registering the first functionality for the PTT call at the second edge PTT server with the central PTT server. In some embodiments, the method further includes: storing the service information at the central PTT server, where data required for performing the first functionality is maintained in the central PTT server and is cached and synchronized to the first edge PTT server. In some embodiments, the method further includes: storing the service information at the first edge PTT server, where data required for performing the first functionality is maintained in the first edge PTT server and is cached and synchronized to the central PTT server. In some embodiments, the performing the first functionality for the PTT call at the first edge PTT server includes: performing the first functionality in an isolated mode when connectivity to the central PTT server is unavailable. In some embodiments, performing the first functionality for the PTT call includes: arbitrating all control messages for the PTT call at the first edge PTT server when the central PTT server is unavailable. In some embodiments, performing the first functionality for the PTT call includes: arbitrating a first subset of control messages for the PTT call at the first edge PTT server when the central PTT server is available. In some embodiments, the method further includes: performing a second functionality for the PTT call at the central PTT server when the central PTT server is available by arbitrating a second subset of control messages for the PTT call at the central PTT server. In some embodiments, the method further includes: decreasing a bit rate of an audio stream for the PTT client at the first edge PTT server in response to detecting congestion in the first network. In some embodiments, the method further includes: throttling notification messages for the PTT client at the first edge PTT server in response to detecting congestion in the first network.

In an embodiment, a method includes: copying service state information for a push-to-talk (PTT) client from a first edge PTT server to a second edge PTT server, the service state information being for a service session established with a PTT client, the service session used to conduct a PTT call with the PTT client, the PTT client and the first edge PTT server being in a first network, the second edge PTT server being in a second network different from the first network; unregistering a first functionality for the PTT call from the first edge PTT server; registering the first functionality for the PTT call at the second edge PTT server; and performing the first functionality for the PTT call at the second edge PTT server.

In some embodiments, the method further includes: notifying a central PTT server of the registering the first functionality for the PTT call at the second edge PTT server. In some embodiments, performing the first functionality for the PTT call includes: arbitrating all control messages for the PTT call at the second edge PTT server when the central PTT server is unavailable. In some embodiments, performing the first functionality for the PTT call includes: arbitrating a subset of control messages for the PTT call at the second edge PTT server when the central PTT server is available.

In an embodiment, a system includes: central push-to-talk (PTT) server implemented on a first electronic processor in a first network; a first edge PTT server implemented on a second electronic processor in a second network, the first edge PTT server configured to: synchronize service information for a PTT client between the central PTT server and the first edge PTT server, the PTT client being in the second network; establish a PTT call with the PTT client in accordance with the service information; store service state information for the PTT client; register a first functionality for the PTT call with the central PTT server; and perform the first functionality for the PTT call; and a second edge PTT server implemented on a third electronic processor in a third network, the third network being different from the second network, the second edge PT server configured to: copy the service state information for the PTT client from the first edge PTT server; unregister the first functionality for the PTT call from the first edge PTT server with the central PTT server; and register the first functionality for the PTT call at the second edge PTT server with the central PTT server.

In some embodiments, the second network is a first radio access network (RAN) and the third network is a second RAN. In some embodiments, the second network is a local area network and the third network is a radio access network (RAN).

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and alterations can be made herein without departing from the spirit and scope of this disclosure as defined by the appended claims.

FIG. 1 illustrates a communications system 100, which provides an architecture for supporting a PTT communications solution in accordance with some embodiments. Communications system 100 includes client devices 102, a network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "PTT clients") reside on client devices 102 for accessing various PTT functions.

Client devices 102 may communicate with PTT platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, 3GPP standards for mission critical communications, and the like In some embodiments, network 104 may comprise various other devices, such as relays, low power nodes, and the like. Network 104 may further include backhaul network components, such as various gateways, routers, controllers, schedulers, and the like.

In an embodiment where PTT platform 106 is a PTT-over-Cellular (PoC) platform, subscribers to a PTT solution (e.g., users operating PTT clients on client devices 102) may be provisioned onto the communications system 100 via interfaces to carriers (e.g., cellular carriers). PTT customers (e.g., enterprises) may administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

In some embodiments, PTT platform 106 uses container technology for virtualization of a PTT system architecture, such as, the virtualization of provided PTT services. Example container technologies may include Docker, Rocket, LXD, and the like although the architecture is not limited to a specific container technology. Virtualization using container technology may allow PTT platform 106 to adopt a micro-services model in which service clusters are considered the building blocks of the system architecture. For example, each function provided by PTT platform 106 may be virtualized in a unique service cluster, and each service cluster may perform a different function in PTT platform 106. Service clusters are hosted on virtual machines (VMs) of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT platform 106 incorporates distributed databases, clustering technologies, data analytics tools, and messaging middleware to provide a robust, scalable platform. PTT platform 106 may use fully virtualized components with a layered approach to service orchestration, which allows PTT platform 106 to be integrated into various cloud environments, such as a carrier's private cloud infrastructure, a dedicated PTT cloud infrastructure, combinations thereof, and the like. Other telecommunication services platforms, including other PTT platforms, may be used in other embodiments.

In accordance with various embodiments, the PTT platform 106 is implemented with MEC. When using MEC, some or all of the functionality of the PTT platform 106 is implemented in the network 104. In particular, the functionality of the PTT platform 106 is split such that some functionality used for conducting a PTT call is implemented on PTT servers located in the network 104, and other functionality used for conducting the PTT call is implemented on PTT servers located in another network (such as a data center or a cloud network).

MEC may be implemented in a variety of configurations for the network 104, such as when the network 104 is a mobile network, a corporate network, an isolated operations (IOps) network, or the like. For example, in embodiments where the network 104 is a mobile network, some PTT functionality is implemented on PTT servers in the RAN for the mobile network. In such an example, the PTT servers may be deployed at a base station site (e.g., eNB) of the RAN, a radio network controller (RNC) site of the RAN, a cell aggregation site of the RAN, or the like. Likewise, in embodiments where the network 104 is a corporate local area network, some PTT functionality is implemented on PTT servers in the corporate local area network.

Figure 2:
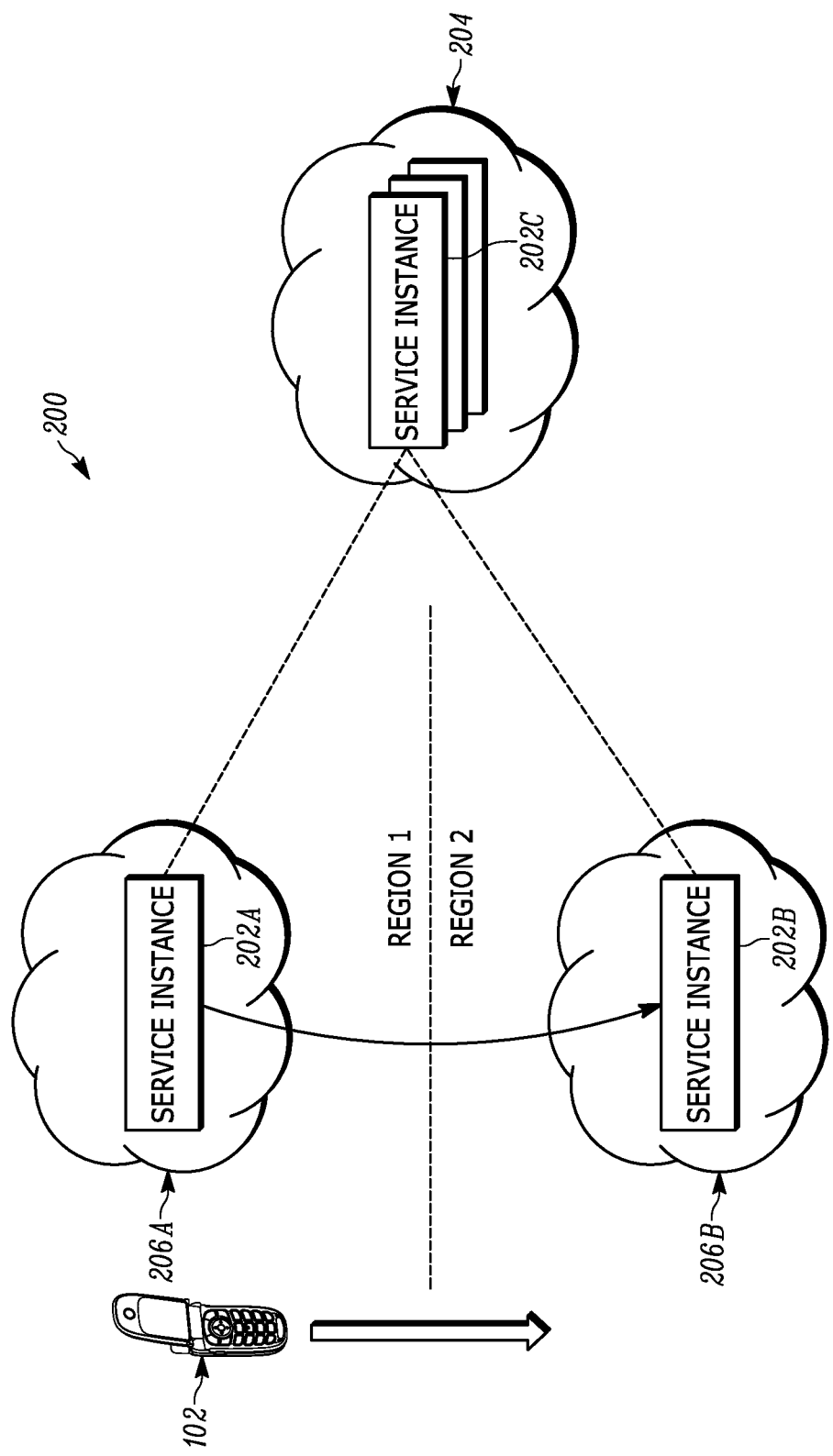
FIG. 2 illustrates a block diagram of a MEC platform, in accordance with some embodiments.

FIG. 2 illustrates a block diagram of a MEC platform 200, in accordance with some embodiments. In the MEC platform 200, service instances for the PTT platform 106 are hosted at a centralized cloud location 204 as well as edge cloud locations, such as an edge cloud location 206A which is associated with a 'Region 1' and an edge cloud location 206B which is associated with 'Region 2.' For example, service instances 202A and 202B may be hosted, respectively, at the edge cloud locations 206A and 206B, and one or more service instances 202C may be hosted at the centralized cloud location 204. The service instances are instances of, e.g., virtual machines that host services used by clients in the PoC system. As discussed further below, the service instances 202A, 202B, and 202C may perform the same or different functionality for the PTT platform 106.

The services instances 202A, 202B, and 202C may also provide telecommunications services such as UE identity services, bandwidth manager services, location services, radio network information services, service relocation services, service discovery services, connectivity services, persistent data store services, traffic routing services, domain name service (DNS), time synchronization services, and other mobile edge application services in addition to PTT services. The telecommunications services provided by the MEC platform 200 may be in accordance with one or more standards/specifications, such as European Telecommunications Standards Institute (ETSI) Group Specification (GS) MEC 001 (Terminology), ETSI GS MEC 002 (High Level Requirements), ETSI GS MEC 003 (Reference Architecture), or the like.

The edge cloud locations 206A and 206B correspond to networks located in different regions. During operation, a PTT client on a client device 102 (e.g., a UE) located in a first region (e.g., Region 1) may perform service discovery, including mobile edge host selection and interface discovery. Service discovery allows the PTT client to discover the services instance 202A instantiated at the edge cloud location 206A (corresponding to the first region). In the course of operation, the client device 102 may move from the first region to a second region (e.g., Region 2). In response to movement of the client device 102, the service instance 202A is migrated (e.g., state data is copied) to a service instance 202B at the edge cloud location 206B (corresponding to the second region).

Various embodiments allow service continuity during service instance migration, such that the PTT call may not be interrupted. For example, application state (e.g., data) migration, service instance (e.g., VM/container) migration, and connection migration mechanisms may be used to ensure service continuity. The initiation of the service instance 202B at the edge cloud location 206B (e.g., for the second region) may be triggered on-demand by the client device 102 and/or an administrator. The services instances 202C hosted at the centralized cloud location 204 may provide cloud capacity augmentation, geographic redundancy, and/or services to client devices when a service instance 202A or 202B is not provisioned on an edge cloud location 206A or 206B.

Figure 3A:
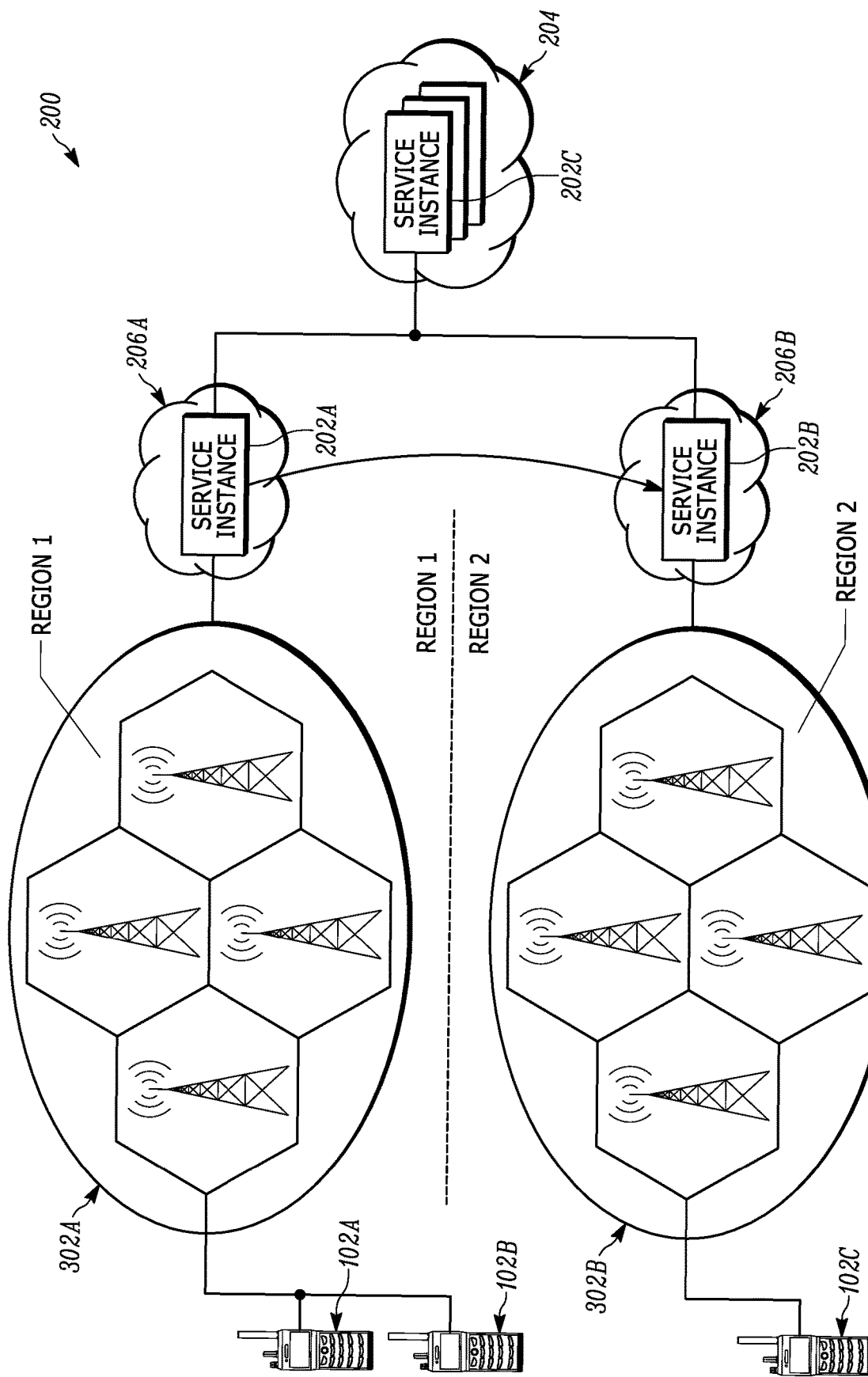
FIGS. 3A, 3B, and 3C illustrate embodiment MEC deployment models, in accordance with some embodiments.
Figure 3B:
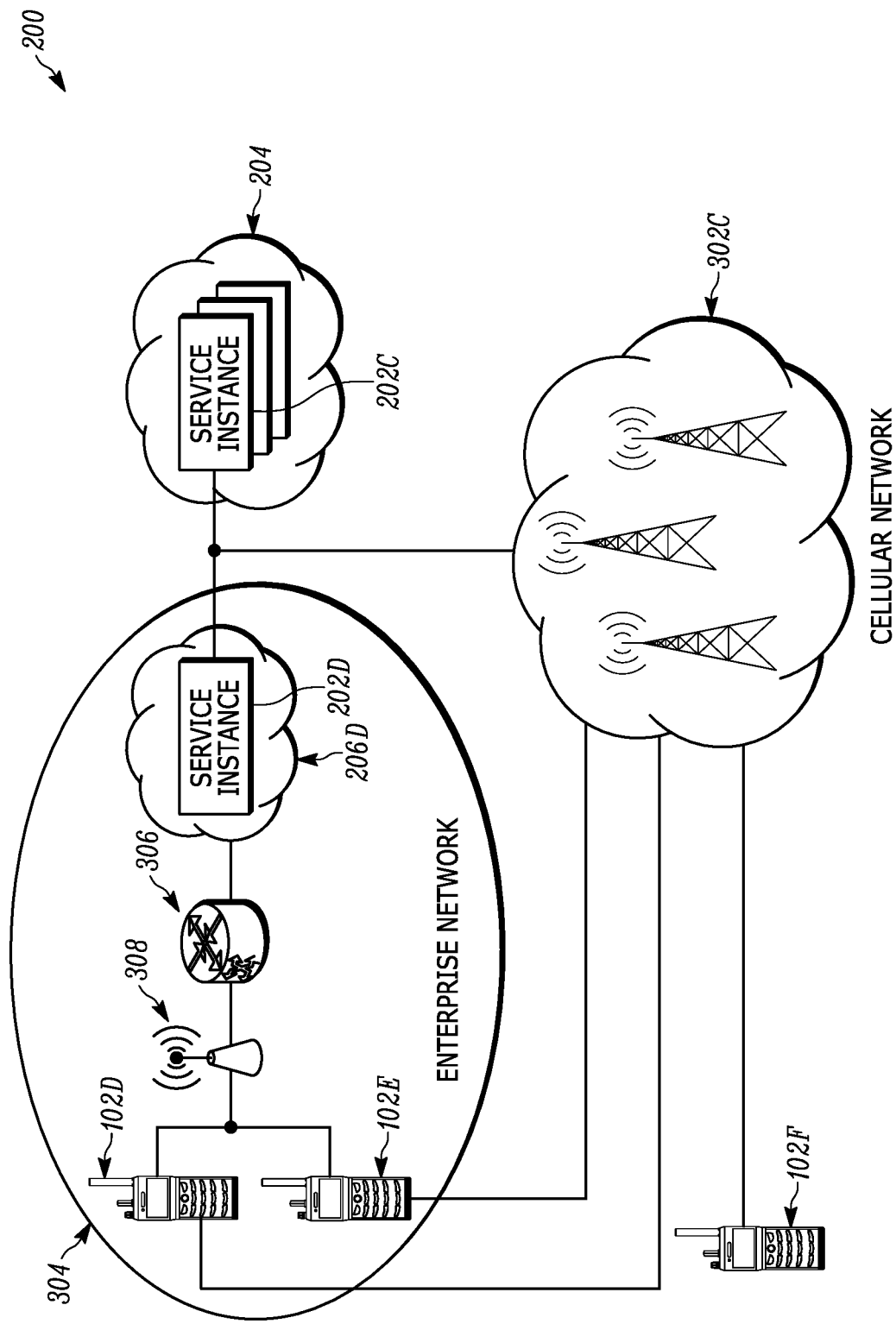
Figure 3C:
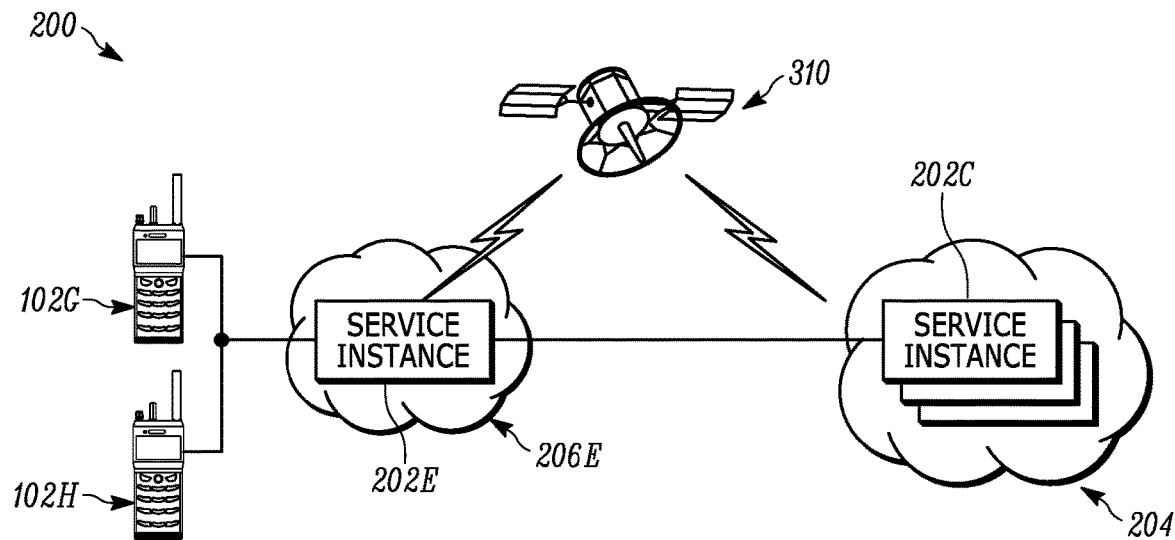

FIGS. 3A, 3B, and 3C illustrate embodiment MEC deployment models, in accordance with some embodiments. FIG. 3A illustrates a block diagram of an embodiment MEC deployment model for carrier hosted services, where the edge cloud locations 206A and 206B are, respectively, located close to or in cellular networks 302A and 302B. In an embodiment, the edge cloud locations 206A and 206B may be co-located with an eNodeB that is serving the client devices 102 (e.g., UEs 102A, 102B, and 102C). For example, the edge cloud locations 206A and 206B may be part of the RAN for the cellular networks 302A and 302B, respectively.

FIG. 3B illustrates a block diagram of an embodiment MEC deployment model for enterprise deployment, where an edge cloud location 206D is located close to or in an enterprise network 304. For example, the edge cloud location 206D may be coupled to the local area network 306 of the enterprise network 304, and may communicate with UEs 102D and 102E via Wi-Fi access points 308. In such embodiments, a UE 102F outside of the enterprise network 304 may communicate with the service instances 202C in the centralized cloud location 204 via a cellular network 302C. The UEs 102D and 102E may further maintain a connection and communicate with the service instances 202C in the centralized cloud location 204 via the cellular network 302C, e.g., as a fallback mechanism. The cellular network 302C may or may not have an edge cloud location (not shown) hosting service instances.

FIG. 3C illustrates a block diagram of an embodiment MEC deployment model for enterprise deployment, where an edge cloud location 206E is partially or totally isolated from the centralized cloud location 204. For example, in an isolated operations (IOps) deployment scenario, the edge cloud location 206E may host its own service instances 202E and may communicate with the centralized cloud location 204 over a high-latency or low-bandwidth connection, such as a satellite network 310. In such embodiments, the edge cloud location 206E may be hosted in an edge host that provides its own mobile network (e.g., standalone eNB, EPC core, or app servers). UEs 102G and 102H may connect to the centralized cloud location 204 over the mobile network provided at the edge cloud location 206E.

Figure 4:
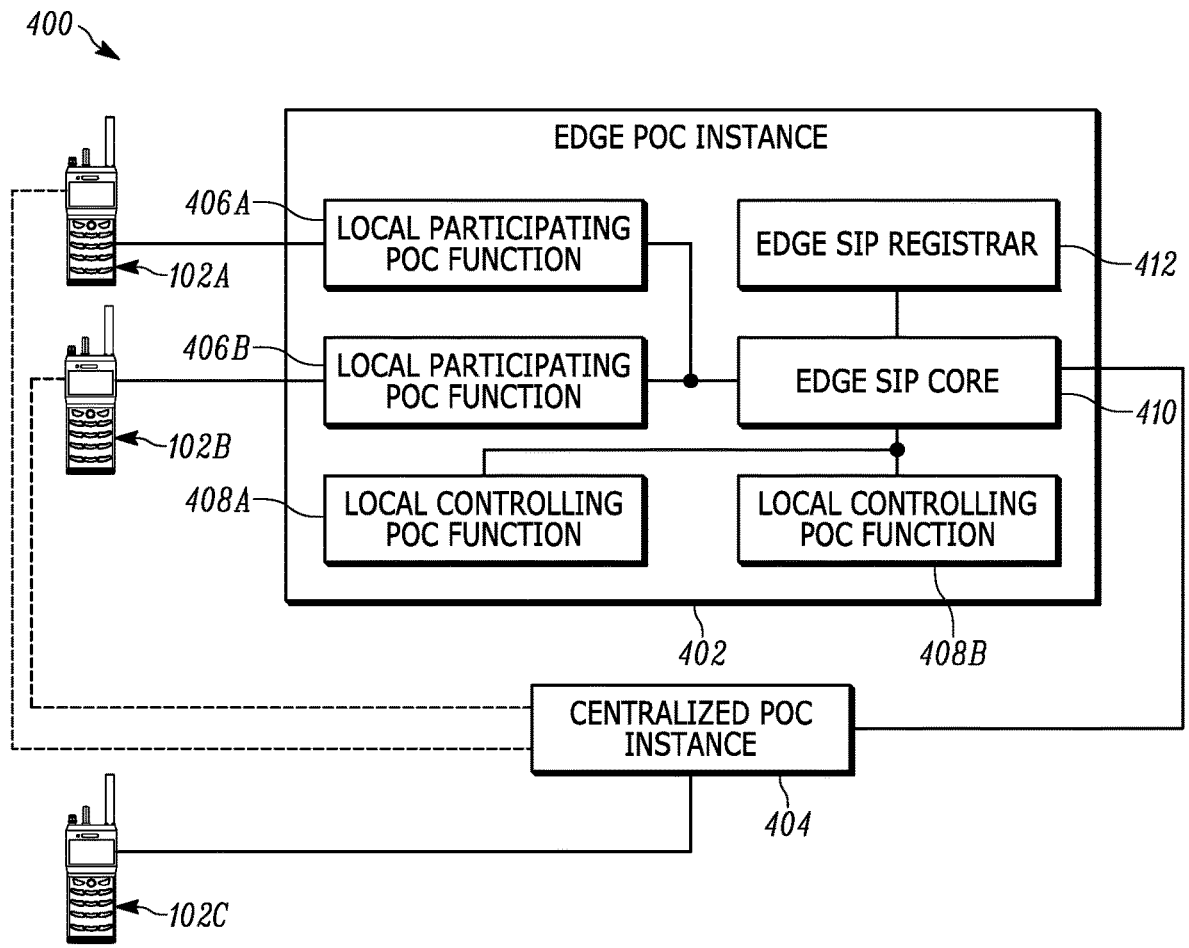
FIG. 4 illustrates a block diagram for a service architecture for a PoC system on MEC, in accordance with some embodiments.

FIG. 4 illustrates a block diagram for a service architecture 400 for a PoC system on MEC, in accordance with some embodiments. Although a PoC system is described, embodiments may also be applied to PTT over other types of connections. In the service architecture 400, PoC clients on the UEs 102A and 102B may maintain a connection with an edge PoC service instance 402 as well as a redundant, simultaneous connection with a central PoC service instance 404 for geographic redundancy and to maintain service continuity when migrating from one edge PoC service instance 402 to another (e.g., as triggered by movement of the client devices 102 from one region to another region). The edge PoC service instance 402 corresponds to the service instances 202A and 202B, and the central PoC service instance 404 corresponds to the service instance 202C. Some client devices (e.g., the UE 102C) accessing the PoC system may only maintain a single connection with the central PoC service instance 404 without a simultaneous connection to an edge PoC service instance 402. For example, the UEs 102A and 102B may be clients engaging in a PTT call using a PTT service in an edge cloud location (e.g., as part of an enterprise network), and the UE 102C may be a client engaging in the PTT call using a PTT service in a central location.

The edge PoC service instance 402 includes instances of participating PoC functions for the client devices (e.g., the UEs 102A and 102B). The edge PoC service instance 402 registers PoC functionality with the central PoC service instance 404 and performs the registered PoC functionality. The edge PoC service instance 402 registers and performs local participating PoC functions 406A and 406B and local controlling PoC functions 408A and 408B. Registering includes retrieving UE-related data from the central PoC service instance 404, adding data to a cache at the edge PoC service instance 402, and notifying the central PoC service instance 404 of UE registration at the edge PoC service instance 402.

Local participating PoC functions 406A and 406B at the edge PoC service instance 402 may handle pre-established sessions, provide local control of call priority and preemption, provide audio mixing for concurrent media streams, adjust bit rates of the media streams, provide call recording and user event logging, provide adaptive quality of experience (QoE) based on local network congestion status, and the like. The local participating PoC functions 406A and 406B may be instantiated per-client such that the local participating PoC function 406A is used for the UE 102A and the local participating PoC function 406B is used for the UE 102B. The local participating PoC functions 406A and 406B may perform the same or different functions.

Local controlling PoC functions 408A and 408B at the edge PoC service instance 402 may handle session initiation protocol (SIP) core and registration, location services, situational awareness, and the like. The local controlling PoC functions 408A and 408B at the edge PoC service instance 402 may coordinate with the central controlling PoC functions at the central PoC service instance 404 for PTT floor arbitration, and take over controlling function when some or all members of a call are local (e.g., located in a region close to the edge PoC service instance 402) or when connections to the central PoC service instance 404 are not available. During SIP core and registration, edge SIP core 410 and registrar 412 instances may: send third party REGISTER messages to the central PoC service instance 404, proxy SIP requests to the central PoC service instance 404 to connect to users and groups that are not localized within an edge cloud, route requests between instances of local participating PoC functions 406A and 406B and local controlling PoC functions 408A and 408B, the like, and combinations thereof. The location service instances may provide: location report stream processing, geo-fencing, points of interest, map overlays, indoor maps, the like, and combinations thereof. The situational awareness instances may provide: adaptive quality of service (QoS) profile settings, localized incident detection and management, situation-aware navigation, the like, and combinations thereof. The local controlling PoC functions 408A and 408B may be instantiated per-group such that one local controlling PoC function 408A or 408B is used for each PTT call group the UEs 102A and 102B are participating in.

As an example of PoC function registration, an edge PoC service instance 402 may register message controlling PoC functions so that the edge PoC service instance 402 may perform floor arbitration locally for some of the client devices (e.g., the UEs 102A and 102B), e.g., for a subset of control messages for a PTT call. The central PoC service instance 404 may arbitrate other control messages for the PTT call. As another example, an edge PoC service instance 402 may register audio controlling PoC functions so that the edge PoC service instance 402 may perform audio mixing or bit rate control of audio for some of the client devices (e.g., the UEs 102A and 102B). As yet another example, an edge PoC service instance 402 may register notification controlling PoC functions so that the edge PoC service instance 402 may handle notification messages for some of the client devices (e.g., the UEs 102A and 102B) based on resource use (e.g., may throttle notification messages when needed). Once the PoC function has registered and is performing its respective function, the central PoC service instance 404 may not perform that function to the extent it is performed by the edge PoC service instance 402.

Figure 5A:
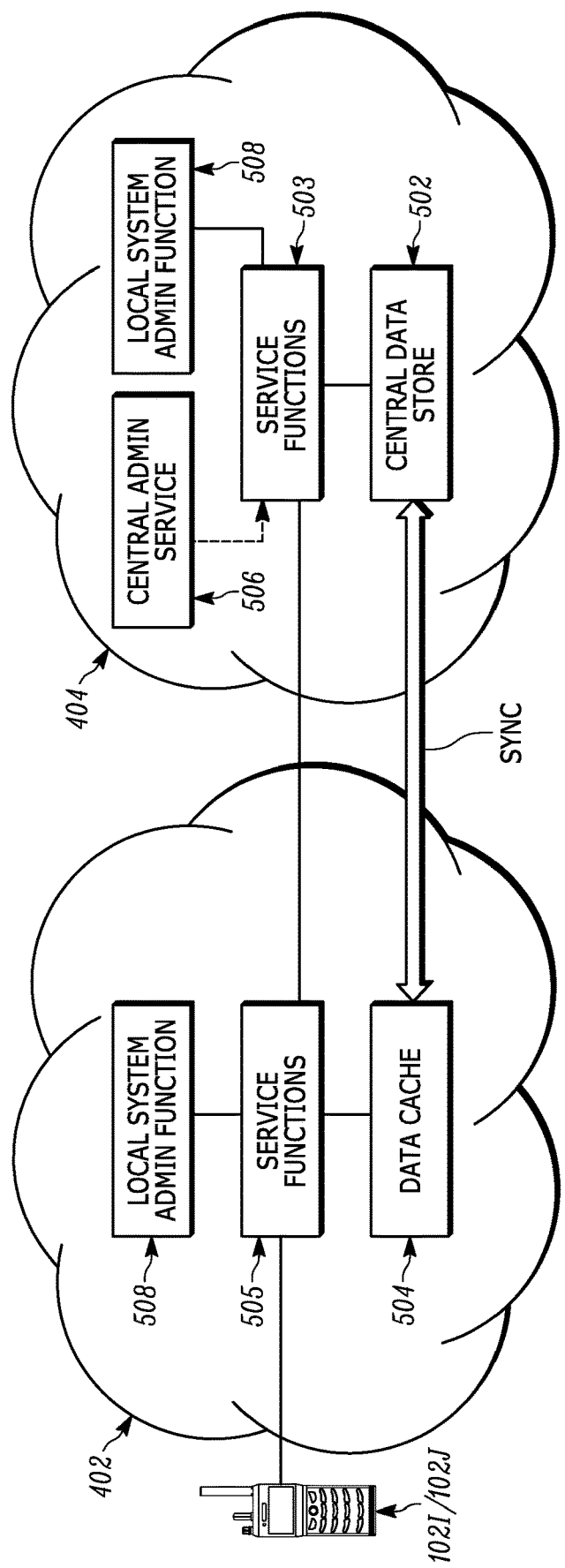
FIGS. 5A and 5B illustrate block diagrams of an architecture for a PoC system on MEC, in accordance with some embodiments.
Figure 5B:
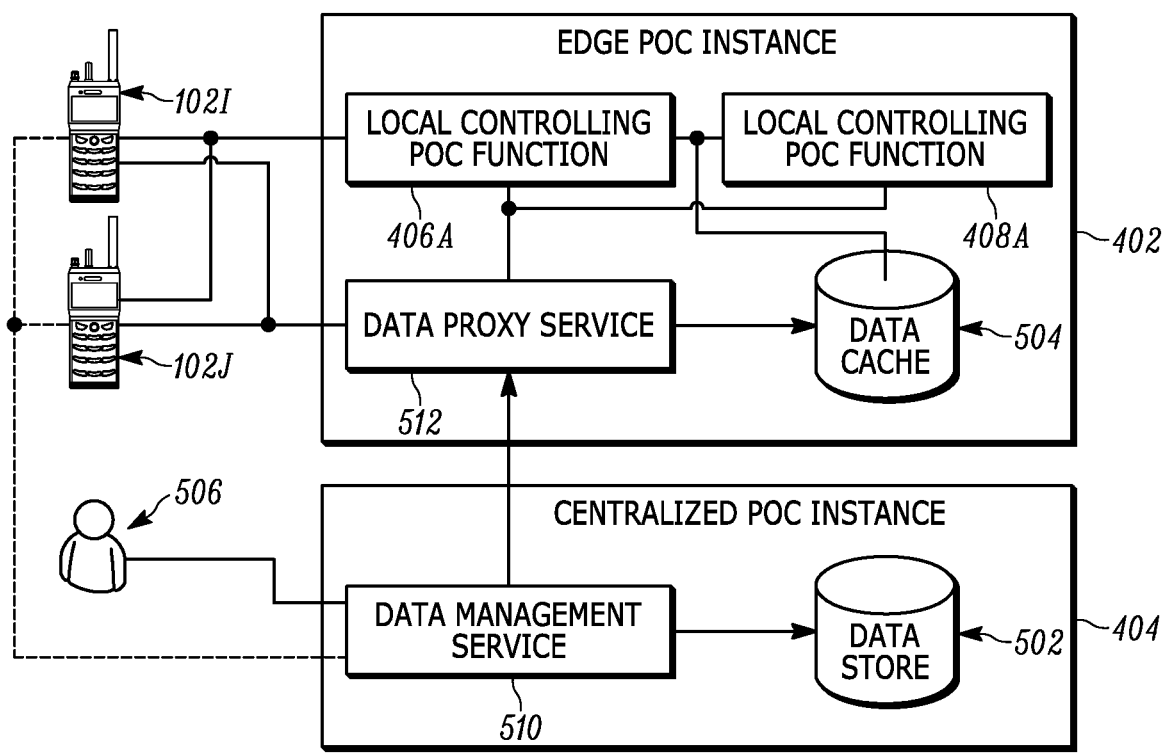

FIGS. 5A and 5B illustrate block diagrams of an architecture for a PoC system on MEC, in accordance with some embodiments. FIG. 5A shows an architecture model and FIG. 5B shows a data model. The embodiment of FIGS. 5A and 5B may be used for a centralized services model, such as when the edge PoC service instance 402 are located close to or in a network, such as the cellular network 302 of FIG. 3A. A centralized services model may be used where edge service mobility is desired. In such a scenario, an edge PoC service instance 402 are deployed as light weight microservices in networks such as the cellular network 302. Such service instances may be quickly instantiated on-demand in the edge cloud for the network, which may be a network corresponding to a location of UEs 1021 and 102J.

In a centralized services model, data storage and system administration is centralized at the central PoC service instance 404. A persistent data store 502 at the central PoC service instance 404 stores and maintains persistent data used by the service function 503 (which may correspond to participating or controlling functions). A data cache 504 is maintained in the edge PoC service instance 402 and synchronized with the persistent data store 502. The data cache 504 is used by service functions 505 (which may correspond to participating or controlling functions). In a centralized model, the edge PoC service instance 402 may have an always-on connection with the central PoC service instance 404. As such, the edge PoC service instance 402 may have partial or complete loss of functionality when the central PoC service instance 404 not accessible.

Service administration may be provided by a central administration service 506 at the central PoC service instance 404, which provides instructions to the service function 503. The administrative instructions may be implemented by local administration functions 508 at the edge PoC service instance 402 and central PoC service instance 404.

A data management service 510 is used to access the persistent data store 502 when data is read or updated (e.g., by the central administration service 506). For example, the data management service 510 may be a XML data management server (XDMS) coupled to the persistent data store 502. A data proxy service 512 at the edge PoC service instance 402 retrieves data required by a local participating PoC function 406A and a local controlling PoC function 408A from the data management service 510. The data proxy service 512 performs data aggregation and proxying, and synchronizes and maintains data locally in the data cache 504.

Figure 6A:
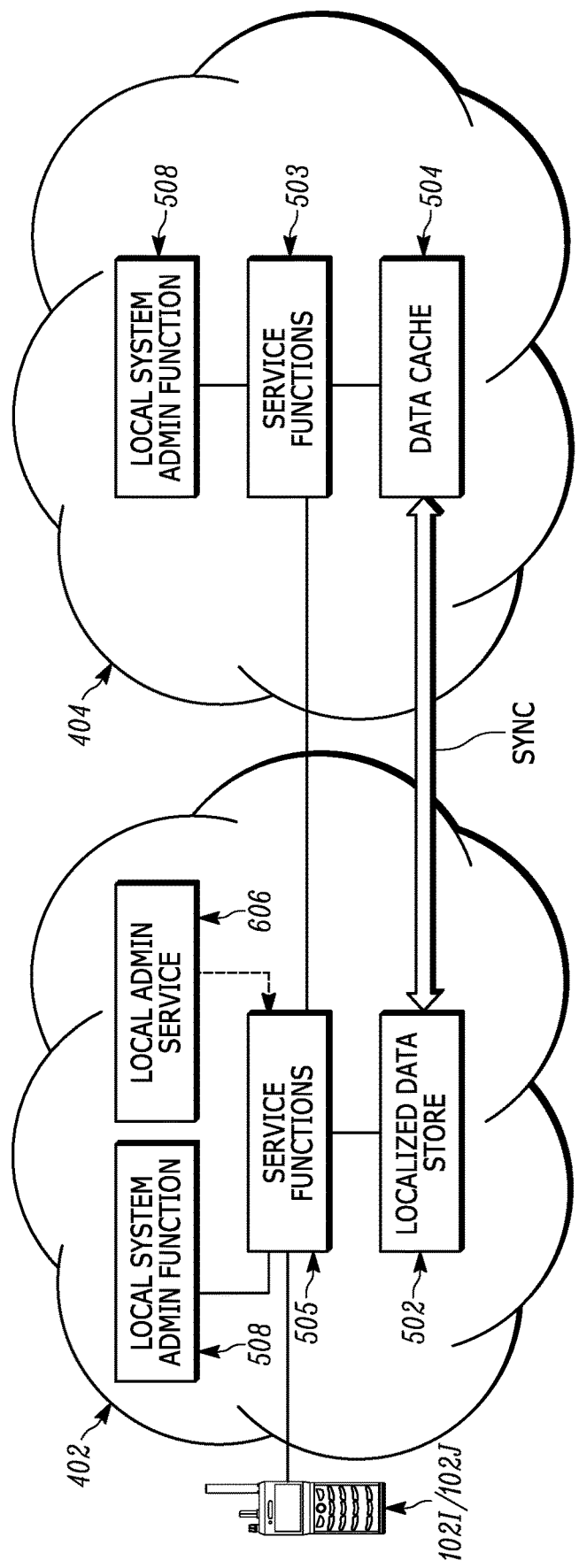
FIGS. 6A and 6B illustrate block diagrams of an architecture for a PoC system on MEC, in accordance with some embodiments.
Figure 6B:
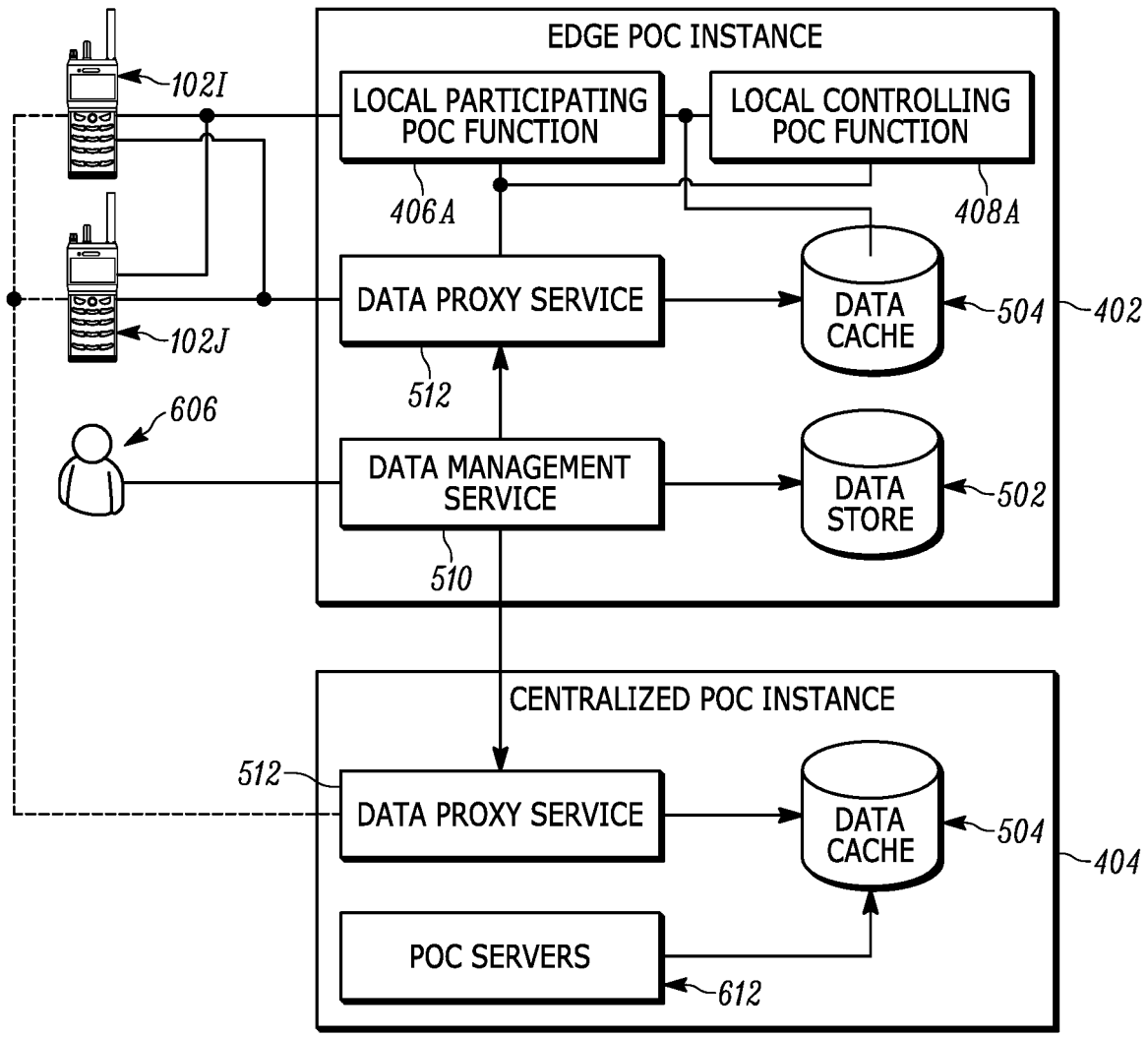

FIGS. 6A and 6B illustrate block diagrams of an architecture for a PoC system on MEC, in accordance with some embodiments. FIG. 6A shows an architecture model and FIG. 6B shows a data model. The embodiment of FIGS. 6A and 6B may be used for a localized services model, such as when the edge PoC service instance 402 is located in an enterprise network, such as the enterprise network 304 of FIG. 3B. A localized services model may be used where isolated operation of the edge service is desired. In such a scenario, users within coverage area of an edge systems connect to an edge PoC service instance 402, and a central service is used to connect to users who are out of service coverage area of the edge systems.

In a localized services model, data storage and system administration is decentralized and distributed at the edge PoC service instance 402. The edge PoC service instance 402 locally maintains a persistent data store 502 that contains persistent data used to serve the users at the edge location. A data cache 504 is maintained at the central PoC service instance 404 (e.g., for use by PoC servers 612) and synchronized with the persistent data store 502 at the edge PoC service instance 402. The edge PoC service instance 402 may also maintain a data cache 504, which may help improve performance.

The service functions 503 may be used to provide geographic redundancy and capacity augmentation of the service function 505. The service functions 505 may be administered locally by a local administration service 606 at the edge PoC service instance 402, which provides instructions to the service functions 503. For example, the local administration service 606 may be co-located with the service function 505 at the edge PoC service instance 402, and the local administration functions 508 may provide controlling functions to the service function 505 independently with and/or in cooperation with the service functions 505.

Because administration and data is decentralized, the edge PoC service instance 402 may remain fully functional even when the central PoC service instance 404 is not accessible.

A data management service 510 is used to access the persistent data store 502 when data is read or updated (e.g., by the local administration service 606). For example, the data management service 510 may be a XDMS coupled to the persistent data store 502. A data proxy service 512 at the edge PoC service instance 402 retrieves data required by the local participating PoC functions 406 and local controlling PoC functions 408 from the data management service 510. The data proxy service 512 performs data aggregation and proxying, and synchronizes and maintains data with the data caches 504.

Figure 7:
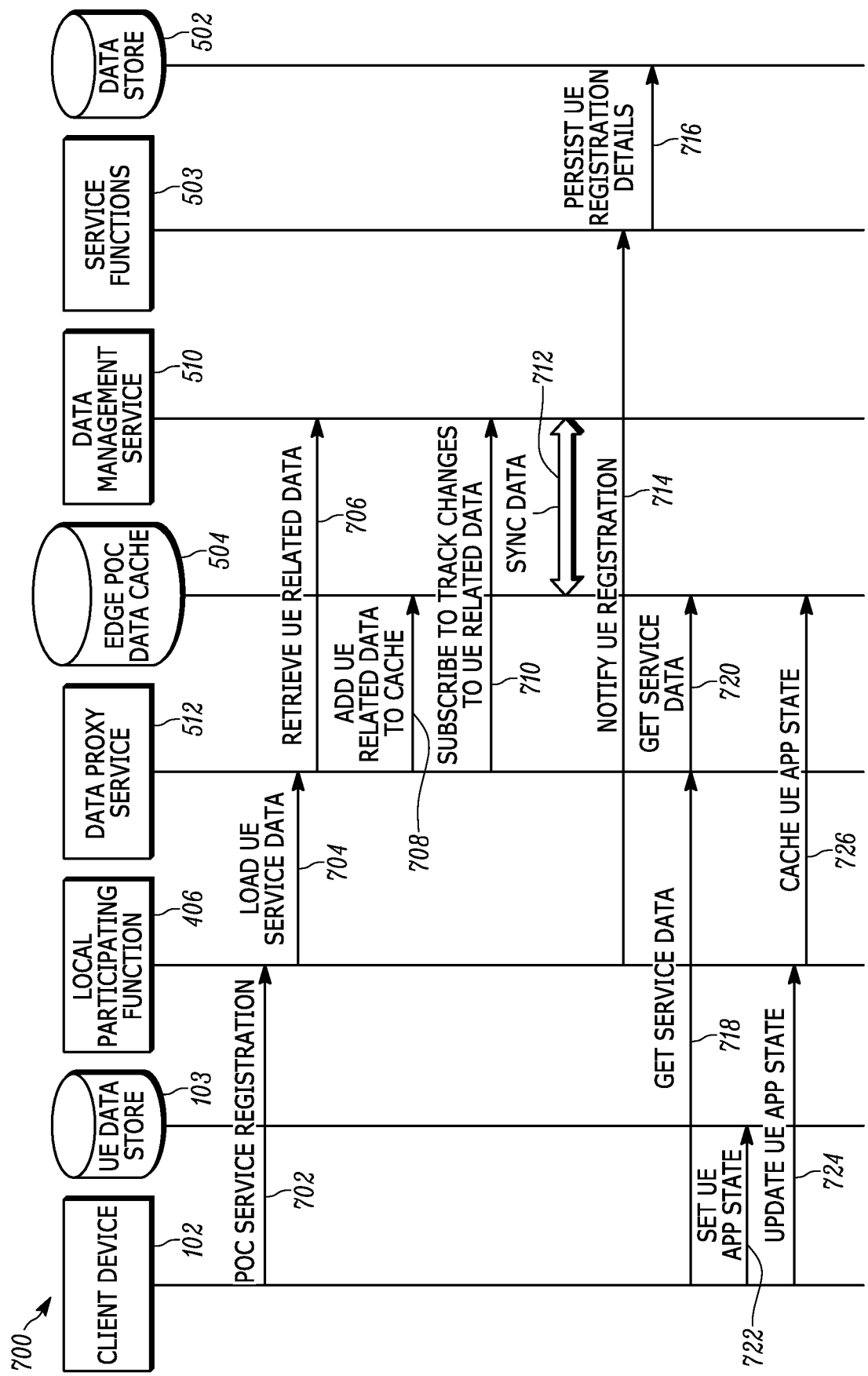
FIG. 7 illustrates a data flow for client device registration, in accordance with some embodiments.

FIG. 7 illustrates a data flow 700 for client device 102 registration, in accordance with some embodiments. In FIG. 7, like reference numerals indicate like elements as described above with respect to FIGS. 5A, 5B, 6A, and 6B. In process 702, PoC service registration is performed by a client device 102 with a local participating function 406. In process 704, the local participating function 406 loads UE service data using the data proxy service 512. In process 706, the data proxy service 512 retrieves UE-related data from the data management service 510. In process 708, the data proxy service 512 adds UE-related data to the data cache 504. In process 710, the data proxy service 512 subscribes with the data management service 510 to track UE-related data changes. In process 712, the UE-related data is synchronized between the data cache 504 and the data management service 510. In process 714, the local participating function 406 notifies the service functions 503 at the central PoC service instance 404 of the UE registration. In process 716, details of the UE registration are persisted to the persistent data store 502 by the service functions 503. In process 718, the client device 102 gets UE service data from the data proxy service 512 to begin migration. In process 720, the data service proxy 512 fetches the UE service data from the data cache 504. In process 722, the application state for the UE is set and stored in a UE data store 103 at the client device 102. In process 724, the application state for the UE is updated at the local participating function 406. In process 726, the application state for the UE is cached at the data cache 504.

Figure 8:
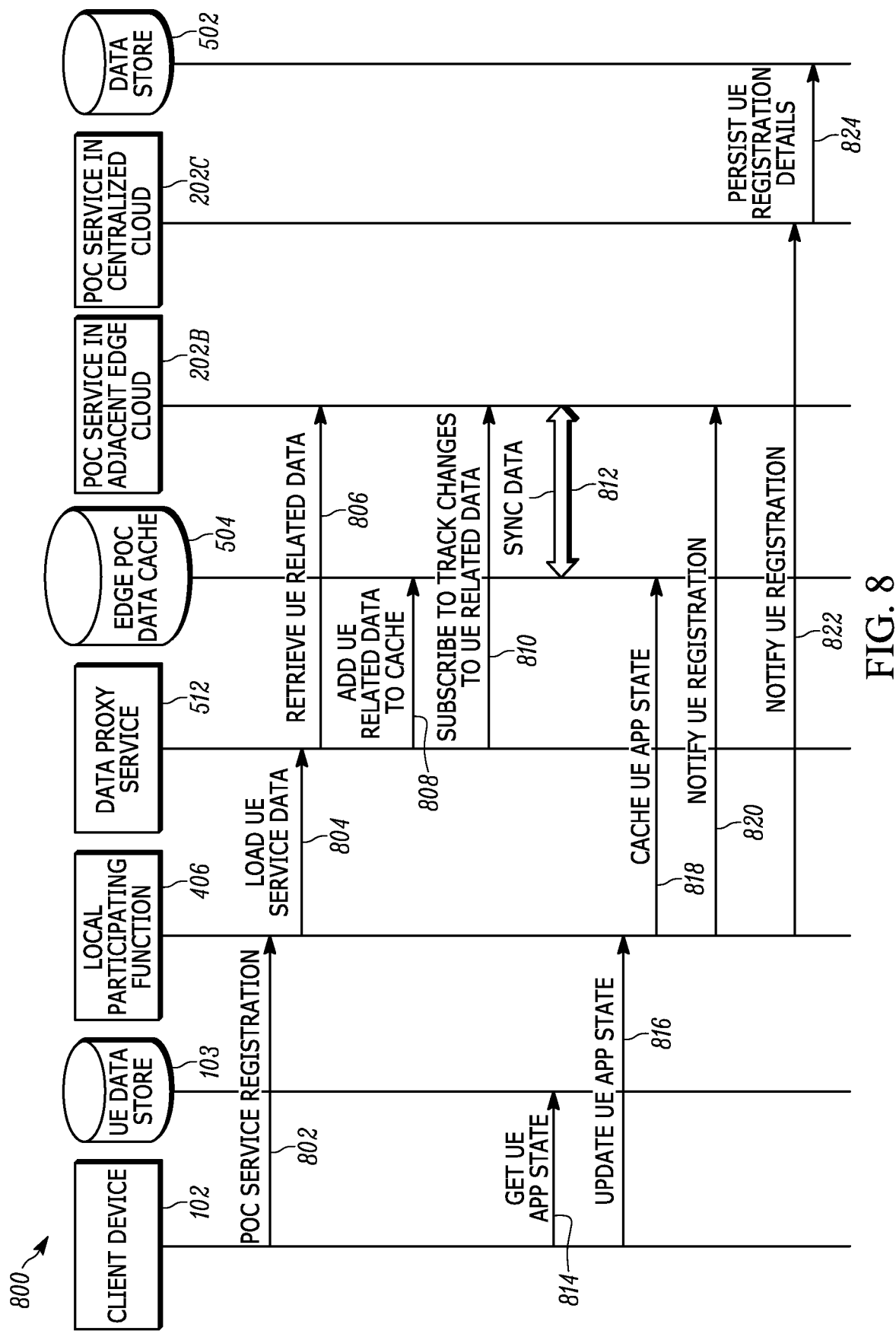
FIG. 8 illustrates a data flow for service migration, in accordance with some embodiments.

FIG. 8 illustrates a data flow 800 for service migration, in accordance with some embodiments. In FIG. 8, like reference numerals indicate like elements as described above with respect to FIGS. 5A, 5B, 6A, and 6B. The data flow 800 illustrates migration of a service instance 202A in an edge cloud to a service instance 202B in an adjacent edge cloud. Details of the service instance 202A are shown. For example, local participating function 406, data proxy service 512, and data cache 504 in FIG. 8 may all be hosted by the service instance 202A. In process 802, PoC service registration is performed by a client device 102 with a local participating function 406. In process 804, the local participating function 406 loads UE service data using the data proxy service 512. In process 806, the data proxy service 512 retrieves UE-related data from the data management service 510. In process 808, UE-related data is added to the data cache 504. In process 810, the data proxy service 512 subscribes to track UE-related data changes with the service instance 202B. In process 812, the data is synchronized between the data cache 504 and the service instance 202B (e.g., to a data cache at the service instance 202B). In process 814, the client device 102 gets UE application state data from its data store 103. In process 816, the UE application state data is updated. In process 818, the UE application state data is cached in data cache 504. In process 820, the service instance 202B is notified of UE registration so that migration to the service instance 202B may be performed. In process 822, the service instance 202C at the central cloud is also notified of the new registrations. In response, the service instance 202C stores the new registration information in the data store 502.

Figure 9:
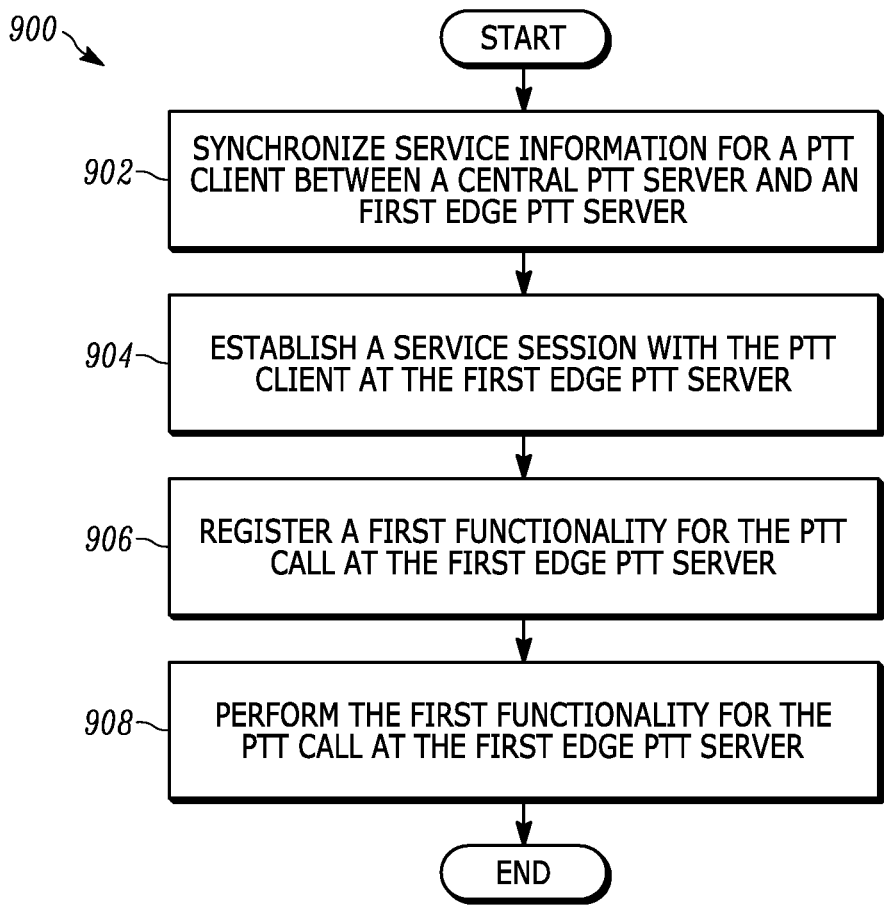
FIG. 9 is a method for registering a PTT client at an edge PoC service instance, in accordance with some embodiments.

FIG. 9 is a method 900 for registering a PTT client at an edge PoC service instance 402, in accordance with some embodiments. The method 900 is performed to register the PTT client (e.g., executing on a client device 102) and set up PTT call functionality for the PTT client at the edge PoC service instance 402.

At operation 902, service information for a push-to-talk (PTT) client is synchronized between a central PTT server (e.g., hosting a central PoC service instance 404) and an first edge PTT server (e.g., hosting an edge PoC service instance 402). The service information may be any information needed to set up a PTT call, and may be stored in the persistent data store 502. As noted above, the persistent data store 502 may be at the edge PoC service instance 402 or the central PoC service instance 404. The first edge PTT server and the PTT client are in a first network, such as the cellular network 302 (e.g., a RAN), the enterprise network 304 (e.g., a local area network), or an IOps network. The central PTT server is in a second network different from the first network, such as a cloud network.

At operation 904, a service session is established with the PTT client at the first edge PTT server. The PTT call is established in accordance with the service information. Several different services may be performed during the service session, including conducting a PTT call with the PTT client.

At operation 906, a first functionality for the PTT call is registered at the first edge PTT server with the central PTT server. The first functionality may be a local participating PoC function 406 or a local controlling PoC function 408. For example, the edge PoC service instance 402 may register functionality such that the local controlling PoC function 408 at the edge PoC service instance 402 may arbitrate some or all control messages for the PTT call.

At operation 908, the first functionality for the PTT call is performed at the first edge PTT server. In embodiments where the edge PoC service instance 402 registers for arbitrating control messages, the first edge PTT server may perform floor control. In some embodiments, such as embodiments where the edge PoC service instance 402 is isolated (e.g., IOps), the first edge PTT server may arbitrate all control messages for the PTT call. In some embodiments, such as embodiments where the edge PoC service instance 402 works with a central PoC service instance 404, the first edge PTT server may arbitrate a subset of control messages for the PTT call, such as only arbitrating floor control messages for the PTT clients using the edge PoC service instance 402. The central PTT server may arbitrate other control messages for the PTT call, such as floor control messages for PTT clients not using the edge PoC service instance 402. In some embodiments, the first edge PTT server may select a winner of the floor control arbitration for local PTT clients, and the central PTT server may select the overall winner.

Optionally, session state information (sometimes called service state information) for the PTT client may be stored at the first edge PTT server. The session state information may include all application state information, such as call state information, which may include information needed to terminate a PTT call at the PTT client. The session state information for the PTT client may be synchronized between the central PTT server and the first edge PTT server, such as by the data management service 510. When the client device 102 corresponding to the PTT client moves to another network, the session state information may be used to set up a new edge service instance.

When migrating to a new edge service instance, the session state information for the PTT client is copied from the first edge PTT server to a second edge PTT server. The second edge PTT server hosts another edge PoC service instance 402, and is located in a different network. The first functionality for the PTT call is unregistered from the first edge PTT server with the central PTT server, and is registered at the second edge PTT server with the central PTT server. The PTT call may then be terminated at the new edge PoC service instance 402.

Other optional operations may be subsequently performed. In some embodiments, the bit rate of an audio stream for the PTT client may be decreased at the first edge PTT server. For example, when the edge PoC service instance 402 detects congestion at the first network, the first edge PTT server may decrease the audio bitrate. The codec bit-rate may be dynamically assigned based on cell congestion status. In some embodiments, notification messages for the PTT client may be managed based on resource usage (e.g., throttled) at the first edge PTT server. One or both of these operations may be performed when the edge PoC service instance 402 is deployed in a RAN, such that the edge PoC service instance 402 may adjust PTT call settings based on traffic for their individual edge networks.

Figure 10:
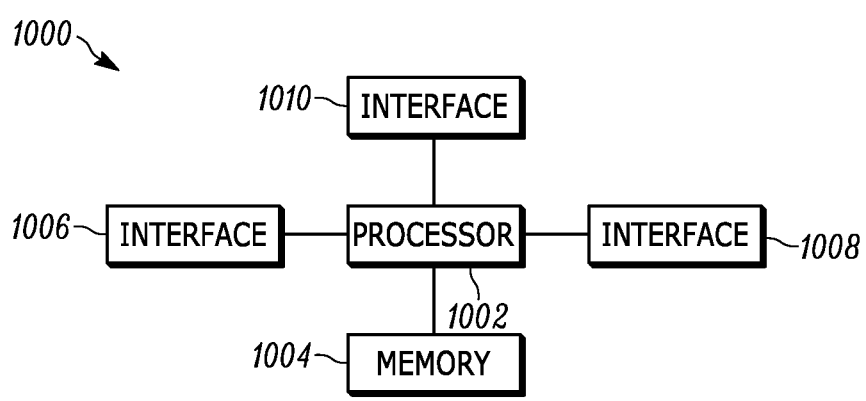
FIG. 10 is a block diagram of a processing system, in accordance with some embodiments.

FIG. 10 is a block diagram of a processing system 1000 for performing methods described herein, which may be installed in a host device. As shown, the processing system 1000 includes a processor 1002, a memory 1004, and interfaces 1006-1010, which may (or may not) be arranged as shown in FIG. 10. The processor 1002 may be any component or collection of components adapted to perform computations and/or other processing related tasks, and the memory 1004 may be any component or collection of components adapted to store programming and/or instructions for execution by the processor 1002. In an embodiment, the memory 1004 includes a non-transitory computer readable medium. The interfaces 1006, 1008, 1010 may be any component or collection of components that allow the processing system 1000 to communicate with other devices/components and/or a user. For example, one or more of the interfaces 1006, 1008, 1010 may be adapted to communicate data, control, or management messages from the processor 1002 to applications installed on the host device and/or a remote device. As another example, one or more of the interfaces 1006, 1008, 1010 may be adapted to allow a user or user device (e.g., personal computer (PC) or the like) to interact/communicate with the processing system 1000. The processing system 1000 may include additional components not depicted in FIG. 10, such as long term storage (e.g., non-volatile memory or the like).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch or the like), or any other device adapted to access a telecommunications network.

Figure 11:
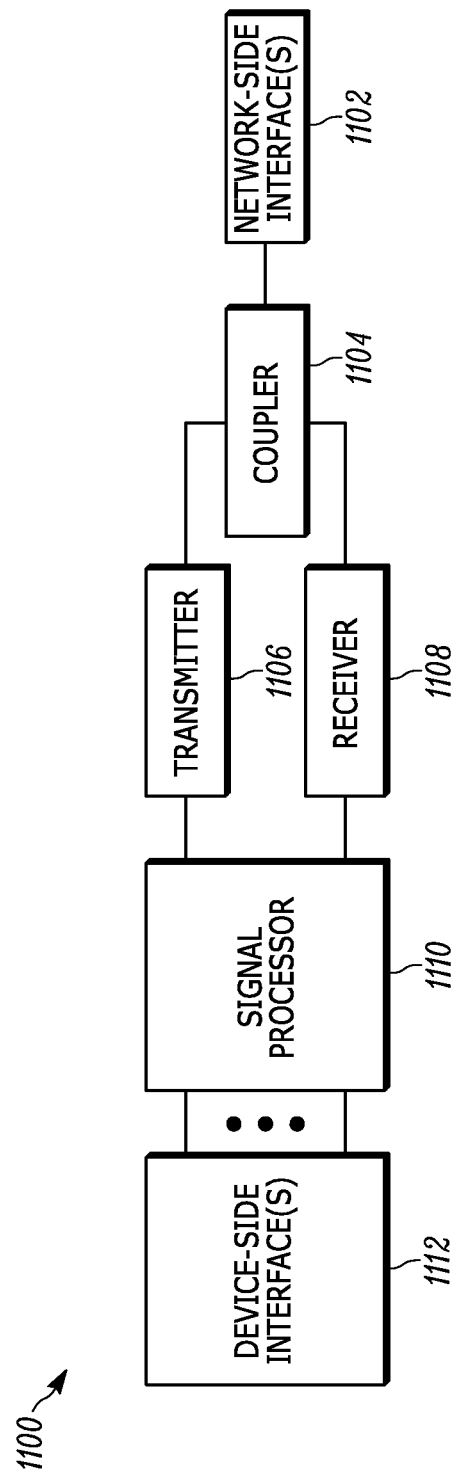
FIG. 11 is a block diagram of a transceiver, in accordance with some embodiments.

In some embodiments, one or more of the interfaces 1006, 1008, 1010 connects the processing system 1000 to a transceiver adapted to transmit and receive signaling over the telecommunications network. FIG. 11 is a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, and the like) adapted to convert a baseband signal into a modulated carrier signal suitable for transmission over the network-side interface 1102. The receiver 1108 may include any component or collection of components (e.g., down-converter, low noise amplifier, and the like) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, and the like).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE) or the like), a wireless local area network (WLAN) protocol (e.g., Wi-Fi or the like), or any other type of wireless protocol (e.g., Bluetooth, near field communication (NFC), and the like). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), and the like In other embodiments, the transceiver 1100 transmits and receives signaling over a wireline medium, e.g., twisted-pair cable, coaxial cable, optical fiber, and the like. Specific processing systems and/or transceivers may utilize all of the components shown, or only a subset of the components, and levels of integration may vary from device to device.

Embodiments may achieve advantages. Local arbitration of messages (such as floor control messages) may be performed at the edge PoC service instance 402 when the central PoC service instance 404 is not available. Fan-out from the central PoC service instance 404 to the edge PoC service instance 402 allows the PTT platform 106 to be more distributed. Some clients may be served by an edge PoC service instance 402 and remaining clients may be served by the central PoC service instance 404, alleviating the traffic load on the central PoC servers and cloud network. In some scenarios, a low latency communication link may be used between the central PoC service instance 404 and edge PoC service instance 402, allowing isolated operations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   synchronizing service information for a push-to-talk (PTT) client between a central PTT server and a first edge PTT server, the first edge PTT server and the PTT client being in a first network, the central PTT server being in a second network different from the first network;
   establishing a service session with the PTT client at the first edge PTT server in accordance with the service information, the service session used to conduct a PTT call with the PTT client;
   registering a first functionality for the PTT call at the first edge PTT server with the central PTT server;
   performing the first functionality for the PTT call at the first edge PTT server;
   storing session state information for the PTT client at the first edge PTT server;
   synchronizing the session state information for the PTT client between the central PTT server and the first edge PTT server;
   copying the session state information for the PTT client from the first edge PTT server to a second edge PTT server;
   unregistering the first functionality for the PTT call from the first edge PTT server with the central PTT server; and
   registering the first functionality for the PTT call at the second edge PTT server with the central PTT server.

2. The method of claim 1, wherein the first network is a radio access network (RAN), and the first edge PTT server is deployed at one of a base station site of the RAN, a radio network controller site of the RAN, or a cell aggregation site of the RAN.

3. The method of claim 1, wherein the first network is a local area network.

4. The method of claim 1, further comprising:
   storing the service information at the central PTT server, wherein data required for performing the first functionality is maintained in the central PTT server and is cached and synchronized to the first edge PTT server.

5. The method of claim 1, further comprising:
   storing the service information at the first edge PTT server, wherein data required for performing the first functionality is maintained in the first edge PTT server and is cached and synchronized to the central PTT server.

6. The method of claim 5, wherein the performing the first functionality for the PTT call at the first edge PTT server comprises:
   performing the first functionality in an isolated mode when connectivity to the central PTT server is unavailable.

7. The method of claim 1, wherein performing the first functionality for the PTT call comprises:
   arbitrating all control messages for the PTT call at the first edge PTT server when the central PTT server is unavailable.

8. The method of claim 1, wherein performing the first functionality for the PTT call comprises:
   arbitrating a first subset of control messages for the PTT call at the first edge PTT server when the central PTT server is available.

9. The method of claim 8, further comprising:
   performing a second functionality for the PTT call at the central PTT server when the central PTT server is available by arbitrating a second subset of control messages for the PTT call at the central PTT server.

10. The method of claim 1, further comprising:
    decreasing a bit rate of an audio stream for the PTT client at the first edge PTT server in response to detecting congestion in the first network.

11. The method of claim 1, further comprising:
    throttling notification messages for the PTT client at the first edge PTT server in response to detecting congestion in the first network.

12. A method comprising:
    copying service state information for a push-to-talk (PTT) client from a first edge PTT server to a second edge PTT server, the service state information being for a service session established with a PTT client, the service session used to conduct a PTT call with the PTT client, the PTT client and the first edge PTT server being in a first network, the second edge PTT server being in a second network different from the first network;
    unregistering a first functionality for the PTT call from the first edge PTT server;
    registering the first functionality for the PTT call at the second edge PTT server; and
    performing the first functionality for the PTT call at the second edge PTT server.

13. The method of claim 12, further comprising:
    notifying a central PTT server of the registering the first functionality for the PTT call at the second edge PTT server.

14. The method of claim 13, wherein performing the first functionality for the PTT call comprises:
arbitrating all control messages for the PTT call at the second edge PTT server when the central PTT server is unavailable.

15. The method of claim 13, wherein performing the first functionality for the PTT call comprises:
arbitrating a subset of control messages for the PTT call at the second edge PTT server when the central PTT server is available.

16. A system comprising:
central push-to-talk (PTT) server implemented on a first electronic processor in a first network;
a first edge PTT server implemented on a second electronic processor in a second network, the first edge PTT server configured to:
synchronize service information for a PTT client between the central PTT server and the first edge PTT server, the PTT client being in the second network;
establish a PTT call with the PTT client in accordance with the service information;
store service state information for the PTT client;
register a first functionality for the PTT call with the central PTT server; and
perform the first functionality for the PTT call; and
a second edge PTT server implemented on a third electronic processor in a third network, the third network being different from the second network, the second edge PT server configured to:
copy the service state information for the PTT client from the first edge PTT server;
unregister the first functionality for the PTT call from the first edge PTT server with the central PTT server; and
register the first functionality for the PTT call at the second edge PTT server with the central PTT server.

17. The system of claim 16, wherein the second network is a first radio access network (RAN) and the third network is a second RAN.

18. The system of claim 16, wherein the second network is a local area network and the third network is a radio access network (RAN).

* * * * *